US011204759B1

(12) United States Patent
Best et al.

(10) Patent No.: US 11,204,759 B1
(45) Date of Patent: Dec. 21, 2021

(54) SOFTWARE PATCH COMPARISON

(71) Applicant: Red Hat, Inc., Raleigh, NC (US)

(72) Inventors: Steven Francis Best, Westford, MA (US); David Bryce Arcari, Westford, MA (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 16/909,322

(22) Filed: Jun. 23, 2020

(51) Int. Cl.
| | |
|---|---|
| *G06F 8/65* | (2018.01) |
| *G06F 8/71* | (2018.01) |
| *G06F 8/658* | (2018.01) |
| *H04L 12/58* | (2006.01) |
| *H04L 29/08* | (2006.01) |
| *G06F 9/54* | (2006.01) |

(52) U.S. Cl.
CPC .............. *G06F 8/658* (2018.02); *G06F 8/71* (2013.01); *G06F 9/546* (2013.01); *H04L 51/18* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 9,052,983 B2 | 6/2015 | Farchi et al. | |
| 9,898,280 B2 | 2/2018 | Balachandran | |
| 10,282,550 B1 | 5/2019 | Sheridan et al. | |
| 10,592,343 B2 | 3/2020 | O'Malley et al. | |
| 2005/0216898 A1* | 9/2005 | Powell, Jr. | G06F 16/80 717/141 |
| 2006/0080656 A1* | 4/2006 | Cain | G06F 8/65 717/174 |
| 2009/0051698 A1* | 2/2009 | Boose | G06F 16/56 345/619 |

(Continued)

FOREIGN PATENT DOCUMENTS

| | | |
|---|---|---|
| CN | 104239113 A | 12/2014 |
| CN | 104054051 B | 5/2017 |

OTHER PUBLICATIONS

Balachandran, Vilpin, "Reducing Human Effort and Improving Quality in Peer Code Reviews Using Automatic Static Analysis and Reviewer Recommendation", International Conference on Software Engineering, May 2013, San Francisco, CA, 11 pages.

*Primary Examiner* — Philip Wang
(74) *Attorney, Agent, or Firm* — Haynes and Boone, LLP

(57) ABSTRACT

A method includes, receiving a first version of a software patch for an application. The method further includes receiving a second version of the software patch, the second version being associated with an upstream version of the application. The method further includes, comparing the first version of the software patch with the second version of the software patch, the comparing accounting for differences between the first version of the software patch and the second version of the software patch that result from differences between the application and the upstream version of the application. The method further includes, in response to comparing, tagging the first version of the software patch as a match when there are no differences other than the differences between the first version of the software patch and the second version of the software patch that result from differences between the application and the upstream version of the application.

20 Claims, 5 Drawing Sheets

(56) References Cited

U.S. PATENT DOCUMENTS

| | | | |
|---|---|---|---|
| 2010/0100970 A1* | 4/2010 | Roy-Chowdhury | G06Q 10/06 726/30 |
| 2011/0113424 A1* | 5/2011 | Ewington | G06F 8/658 717/178 |
| 2013/0055227 A1* | 2/2013 | Zachariah | G06F 8/51 717/168 |
| 2013/0326481 A1* | 12/2013 | Kannan | G06F 8/71 717/123 |
| 2014/0196010 A1* | 7/2014 | Balachandran | G06F 8/70 717/124 |
| 2016/0019036 A1* | 1/2016 | Bar-Or | G06F 8/66 717/159 |
| 2016/0170745 A1* | 6/2016 | Best | G06F 8/658 717/122 |
| 2016/0259636 A1* | 9/2016 | Plate | G06F 11/366 |
| 2016/0342632 A1* | 11/2016 | Ford | G06F 16/219 |
| 2017/0052932 A1* | 2/2017 | Caines | G06F 40/194 |
| 2017/0212751 A1* | 7/2017 | Mak | G06F 11/3604 |
| 2018/0203844 A1* | 7/2018 | Greer | G06F 11/3688 |
| 2019/0155598 A1* | 5/2019 | Bainville | G06F 8/71 |
| 2021/0019249 A1* | 1/2021 | Gnaneswaran | G06Q 10/06398 |
| 2021/0021633 A1* | 1/2021 | Landman | H04L 63/20 |

* cited by examiner

110a

Add ICX-D support in intel_rapl driver

Signed-off-by:
Signed-off-by:
---
drivers/powercap/intel_rapl_common.c | 1 +
1 file changed, 1 insertion(+)

diff --git a/drivers/powercap/intel_rapl_common.c b/drivers/powercap/intel_rapl_common.c
index 3a5440d90017..b624a88b2c25 100644 —204a
--- a/drivers/powercap/intel_rapl_common.c
+++ b/drivers/powercap/intel_rapl_common.c
@@ -976,6 +976,7 @@ static const struct x86_cpu_id rapl_ids[] __initconst = {
    INTEL_CPU_FAM6(ICELAKE_MOBILE, rapl_defaults_core),
    INTEL_CPU_FAM6(ICELAKE_DESKTOP, rapl_defaults_core),
202a  INTEL_CPU_FAM6(ICELAKE_X, rapl_defaults_hsw_server),
  + INTEL_CPU_FAM6(ICELAKE_XEON_D, rapl_defaults_hsw_server), INTEL_CPU_FAM6(ATOM_SILVERMONT, rapl_defaults_byt),
    INTEL_CPU_FAM6(ATOM_AIRMONT, rapl_defaults_cht), 110b Add ICX-D support in intel_rapl driver Signed-off-by:
Signed-off-by:
---
drivers/powercap/intel_rapl_common.c | 1 +
1 file changed, 1 insertion(+)

diff --git a/drivers/powercap/intel_rapl_common.c b/drivers/powercap/intel_rapl_common.c
index 91419bd461a5..72dcf6e4cffc 100644 —204b
--- a/drivers/powercap/intel_rapl_common.c
+++ b/drivers/powercap/intel_rapl_common.c
@@ -987,6 +987,7 @@ static const struct x86_cpu_id rapl_ids[] __initconst = {
    INTEL_CPU_FAM6(ICELAKE_MOBILE, rapl_defaults_core),
    INTEL_CPU_FAM6(ICELAKE_DESKTOP, rapl_defaults_core),
202b  INTEL_CPU_FAM6(ICELAKE_X, rapl_defaults_hsw_server),
  + INTEL_CPU_FAM6(ICELAKE_XEON_D, rapl_defaults_hsw_server), INTEL_CPU_FAM6(ATOM_SILVERMONT, rapl_defaults_byt),
    INTEL_CPU_FAM6(ATOM_AIRMONT, rapl_defaults_cht),

*FIG. 2*

SOFTWARE PATCH COMPARISON

FIELD OF DISCLOSURE

The present disclosure generally relates to software patch, and more particularly to software patch management.

BACKGROUND

Software development is the process by which software applications are designed, written, and tested. Even after a software application is deployed and in use, it often undergoes various updates to improve performance and remove bugs. Such updates are often referred to as patches.

Software patches may be installed under programmed control by an automated system. Or, in some cases, a human programmer may manually apply a patch using an editing tool or a debugger. Patches are often applied to program files stored in memory. Patching allows for the modification of compiled and machine language object programs. Patches offer a convenient mechanism for software management and maintenance because users do not have to install new fully compiled or reassembled programs.

SUMMARY

According to one example, a method includes, receiving a first version of a software patch for an application. The method further includes receiving a second version of the software patch, the second version being associated with an upstream version of the application. The method further includes, comparing the first version of the software patch with the second version of the software patch, the comparing accounting for differences between the first version of the software patch and the second version of the software patch that result from differences between the application and the upstream version of the application. The method further includes, in response to comparing, tagging the first version of the software patch as a match when there are no differences other than the differences between the first version of the software patch and the second version of the software patch that result from differences between the application and the upstream version of the application.

According to one example, a method includes receiving a posting of a software patch for a distribution version of an application. The method further includes determining that the software patch has been tagged for comparison with a version of the software patch for an upstream version of the application. The method further includes, in response to the determining, performing a compare operation that compares the software patch for the distribution version of the application with a corresponding software patch for an upstream version of the application, the compare operation being configured to account for differences between the distribution version of the application and the upstream version of the application.

According to one example, a system includes a processor and a memory comprising machine readable instructions that when executed by the processor, cause the system to receive a first version of a software patch for an application and receive a second version of the software patch, the second version being associated with an upstream version of the application. The system is further to compare the first version of the software patch with the second version of the software patch, the comparing accounting for differences between the first version of the software patch and the second version of the software patch that result from differences between the application and the upstream version of the application. The system is further to, in response to the comparing, tag the first version of the software patch as a match when there are no differences other than the differences between the first version of the software patch and the second version of the software patch that result from differences between the application and the upstream version of the application.

BRIEF DESCRIPTION OF THE DRAWINGS

FIG. 2 is a diagram showing illustrative patches for comparison by the patch comparison module, according to one example of principles described herein.

DETAILED DESCRIPTION

Figure 1:
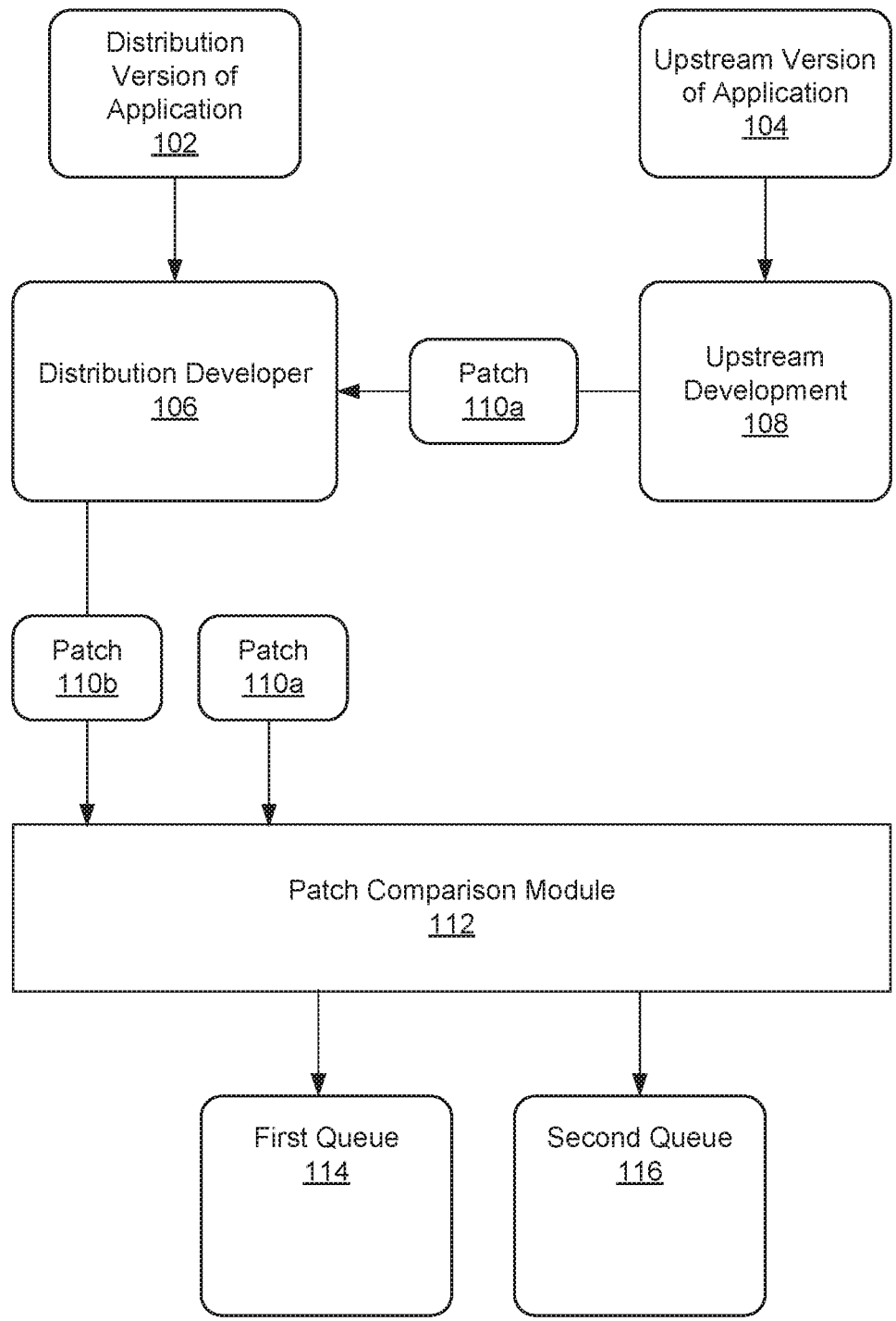
FIG. 1 is a diagram showing an illustrative patch comparison module for comparing distribution and upstream versions of software patches, according to one example of principles described herein.

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As explained above, patches offer a convenient mechanism for software management and maintenance because users do not have to install new fully compiled or reassembled programs. Thus, patches are widely used to maintain large and complex pieces of software. One example of such software is an operating system. Some operating systems, such as Linux are open-source. As such, development of the Linux operating system is decentralized, with multiple teams and individuals from various organizations providing contributions to the software product. The source code, design blueprints, and other documentations are generally made available to the public.

In some cases, various organizations or entities may wish to make their own version of an open-source piece of software. For example, Red Hat Enterprise Linux is a version of Linux developed by Red Hat, Inc. For purposes of discussion, the open-source version of Linux that is developed by the open-source community will be referred to as an up-stream version of Linux and the entity-specific version of Linux (e.g., Red Hat Enterprise Linux) will be referred to as a distribution version of Linux.

As the open-source community provides contributions to maintain the upstream version, they will often provide a number of patches. In the case of Linux, there may be tens of thousands of patches released. Developers of a distribution version of an upstream application may then wish to apply those patches to their own distribution version of the application. Generally, the patches for the distribution version undergo a review process. This review process may take a lot of human resources to make sure the newly developed patches correspond to the upstream patches, or when there are differences, such differences are appropriate.

To improve this process, the present disclosure describes methods and systems for automatically comparing a patch for a distribution piece of software with the corresponding patch for the upstream version of that piece of software. This compare process takes into account the differences between the upstream and distribution versions. In other words, while a simple compare will show the two patches to be different, using the compare functions described herein provide a more sophisticated approach that can account for the differences between the upstream and distribution versions. For example, a compare function may be configured to parse an upstream file that includes several patches. The compare function may also parse a distribution file that includes several patches. The parsed files may then be analyzed and specific sections corresponding to specific patches may be identified. Then, the two patches may be compared. If a difference is detected, the compare function can ignore that difference if that difference is identified as a specific type of expected difference. For example, if the identified difference is a difference in line numbers or index numbers, that difference can be ignored.

Using the principles described herein, development teams may be able to more quickly and efficiently review a large number of patches. Patches that are still flagged as being different, even with the advanced compare feature, can be investigated further to ensure that such differences are appropriate. Alternatively, patches that are not flagged may undergo a less rigorous review.

FIG. 1 is a diagram showing an illustrative patch comparison module 112 for comparing distribution and upstream versions of software patches. According to the present example, the patch comparison module 112 receives a distribution version of a patch 110b for a distribution version of an application 102. The patch comparison module 112 also receives an upstream version of the patch 110a corresponding to the upstream version of the application 104.

FIG. 1 illustrates both an upstream version of an application 104 as well as a distribution version 102 of the application. The upstream application is associated with the upstream development community 108. In some examples, the upstream development community represents a plurality of entities that contribute to an open source project. In some examples, however, the upstream development community may be a single entity or organization.

The upstream version of the application 104 may be one of a variety of applications. For example, the application may be a web browser. In some examples, the application may be a cloud computing management system such as Openstack. In some examples, the application is an operating system. An example of an open source operating system is Linux. Other types of applications may benefit from principles described herein.

As mentioned above, various development entities may wish to produce distribution versions of such open source applications. The distribution versions are derived from the open source version but may have some modifications that are unique to the distribution developer 106. Such modifications may be to help the distribution developer 106 manage the application for its particular clients. In the present example, the distribution developer 106 develops a distribution version of the application 102. The distribution version of the application 102 may be different than the upstream version of the application. Thus, patches for the upstream version of the application may not be directly applicable to the distribution version of the application. Thus, minor modifications may be applied to such patches.

For example, the distribution developer may receive a number of patches from the upstream development community. The patches received include patch 110a. One or more individuals, such as coders or programmers associated with the distribution developer 106 may then create a plurality of distribution patches. Patch 110b is a distribution patch that corresponds to upstream patch 110a received from the upstream development community.

After patch 110b has been created, it may be posted for review. When a user posts the patch for review, the poster may specify that a compare function be applied. The compare function compares the distribution patch 110b with the corresponding upstream patch 110a. This comparison function may then be performed by the patch comparison module 112.

The patch comparison module 112 may include the hardware and the software for comparing software patches. The software patches may be received in the form of files. The patch comparison module 112 may scan through the files and parse them into specific sections for specific parts of code. The patch comparison module 112 may then compare the important parts of code form the upstream patch 110b with the corresponding parts of code from the distribution patch 110a. The important parts of code may exclude line numbers and index numbers, as will be explained in further detail below in the text accompanying FIG. 2.

After the patch comparison module 112 compares the distribution patch 110b with the upstream patch 110a, it may flag the distribution patch 110a as having substantive differences. In other words, the differences between the distribution patch 110b and the upstream patch 110a are more than just the expected differences due to line numbers or index numbers. Thus, the distribution patch may require further review.

In some examples, the patch comparison module 112 may place the distribution patch in one of two queues 114, 116. In the present example, the first queue is for distribution patches that are flagged by the patch comparison module as having substantive differences. This queue is thus for patches for which a more thorough review is to be performed. For example, a programmer, coder, or other user who is responsible for reviewing patches that have been posted can perform a more in-depth review, knowing that the patch has been flagged as having substantive differences. It may be the case that such differences are warranted given the differences between the upstream version of the application and the distribution version of the application. However, the more in-depth review can be done to make this determination.

The second queue is for patches that are not flagged by the comparison module as having substantive differences. These patches may undergo a less thorough review because it has been determined that the only differences between the distribution patch 110b and the upstream patch 110a are non-substantive differences such as line numbers or index numbers in the code.

FIG. 2 is a diagram showing illustrative patches for comparison by the patch comparison module. FIG. 2 illustrates an example of an upstream patch 110a and the distribution patch 110b. As can be seen, many lines of code are similar. However, some lines of code are necessarily different due to the differences between the upstream version of the application and the distribution version of the application.

For example, the index numbers 204a in the upstream patch 110a are different than the index numbers 204b in the distribution patch 110b. Additionally, the line numbers 202a in the upstream patch 110a are different than the line numbers 202b in the distribution patch 110b. Other differences that result from the differences between the upstream version of the application and the distribution version of the applications are contemplated.

Figure 3:
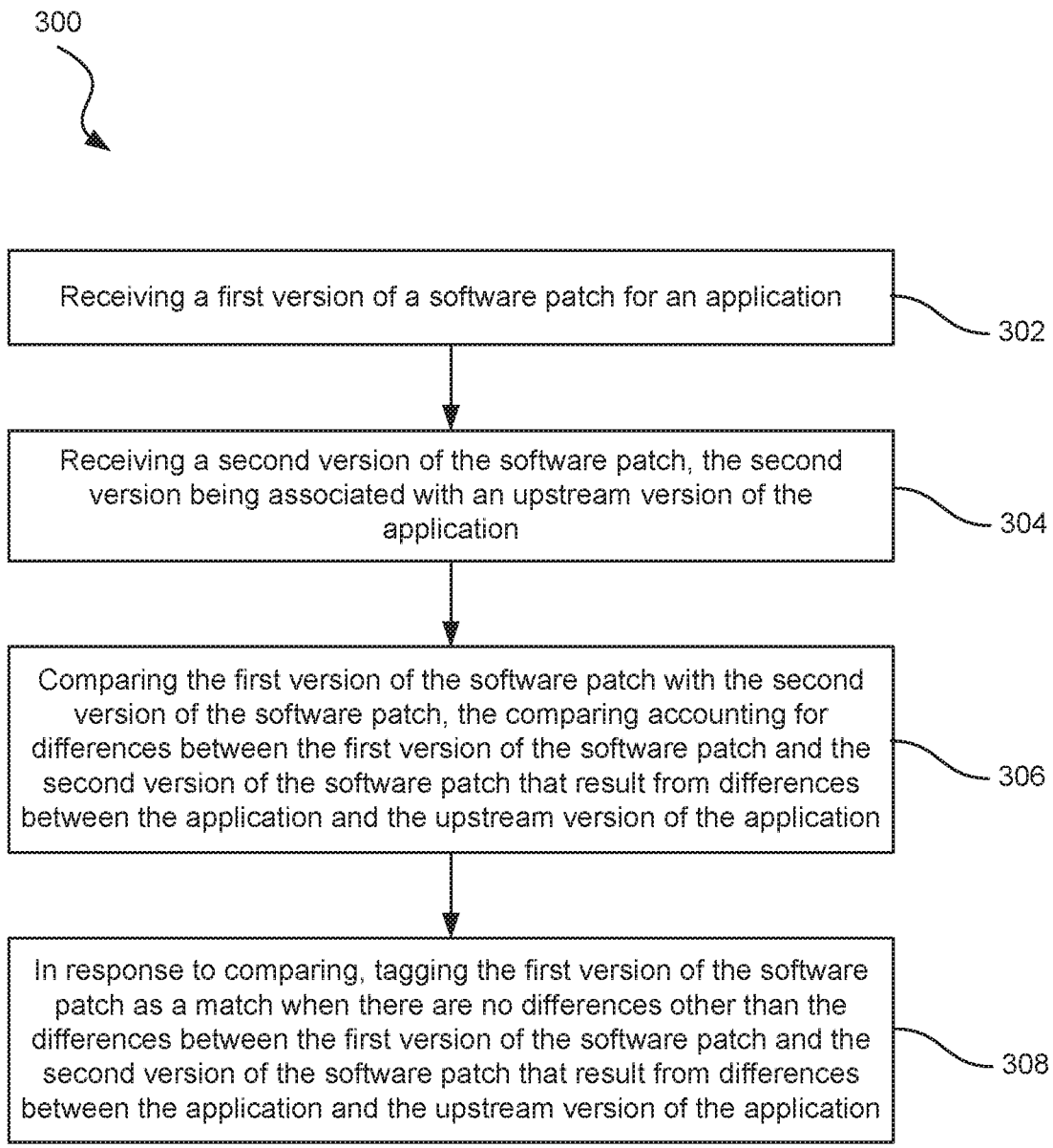
FIG. 3 is a flowchart showing an illustrative method for comparing distribution and upstream versions of patches, according to one example of principles described herein.

FIG. 3 is a flowchart showing an illustrative method for comparing distribution and upstream versions of patches. According to the present example, the method 300 includes a process 302 for receiving a first version of a software patch for an application. In one example, the first version of the software patch is a distribution patch (e.g., 110b) for a distribution version of the application (e.g., 102).

The distribution version of the software patch may be received, for example, by a patch comparison module. The distribution version of the software patch may be received in a variety of ways. In one example, the user who creates the patch may post the patch for review. This may be done by emailing the patch to a designated individual or a designated email address associated with posting the patch. When doing so, the user may add a keyword in the email that instructs the email processing application on the receiving end to forward the attached patch to the patch comparison module. In some examples, the distribution of the patch may be provided directly to the patch comparison module through a web portal. For example, a user may login to a web portal and upload the patch and indicate that the patch is to be compared.

The method 300 further includes a process 304 for receiving a second version of the software patch, the second version being associated with an upstream version of the application (e.g., 104). The second version of the software patch may be, for example, a distribution patch (e.g., 110b). The upstream patch may be received by the patch comparison module in a variety of ways. In one example, in response to receiving the distribution patch, the patch comparison module may request the upstream patch from a database. In some examples, the upstream patch may be provided by a user along with providing the distribution version of the patch. For example, the upstream version of the patch may also be attached in an email or may be uploaded through a web portal.

The method 300 further includes a process 306 for comparing the first version of the software patch with the second version of the software patch, the comparing accounting for differences between the first version of the software patch and the second version of the software patch that result from differences between the application and the upstream version of the application. For example, as described above, the comparing process may ignore certain differences such as line numbers or index numbers. In some examples, the upstream patch and the distribution patch may both be part of larger files that include a number of patches. In such case, the patch comparison module may include the logic to identify the relevant parts of the file and compare patches appropriately.

The method 300 further includes a process 308 for, in response to comparing, tagging the first version of the software patch as a match when there are no differences other than the differences between the first version of the software patch and the second version of the software patch that result from differences between the application and the upstream version of the application. By tagging a distribution patch as a match with the corresponding upstream patch allows a patch reviewer to devote fewer resources to reviewing the patch. Thus, the patch reviewer may be able to devote more resources to patches that are not tagged as having a match. As mentioned above, in one example, patches that are tagged as a match may be placed in one queue for review while patches that are not tagged may be placed in a separate queue for review.

Figure 4:
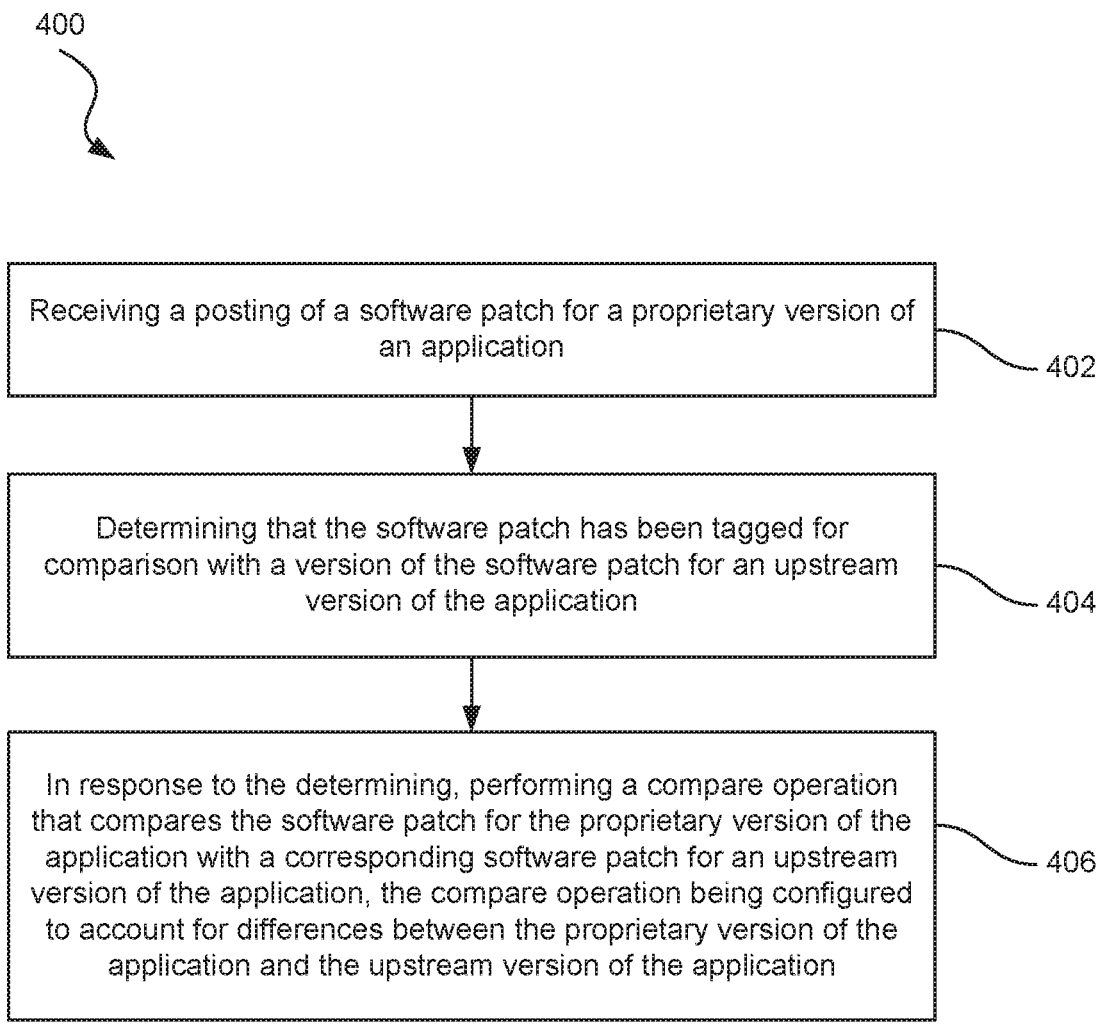
FIG. 4 is a flowchart showing an illustrative method for comparing distribution and upstream versions of patches, according to one example of principles described herein.

FIG. 4 is a flowchart showing an illustrative method for comparing distribution and upstream versions of patches. According to the present example, the method 400 includes a process 402 for receiving a posting of a software patch (e.g., 110b) for a distribution version of an application (e.g., 102). In some examples, the software patch may be received through a web portal. In some examples, the software patch may be received through an email or other messaging system.

The method 400 further includes a process 404 for determining that the software patch has been tagged for comparison with a version of the software patch for an upstream version of the application. The patch may be tagged, for example, by a keyword within the email through which the patch was received. In some examples, the patch may be tagged by the user through the web portal. Allowing a user to tag some patches while not others allows the user to specify which patches he or she thinks should be similar to the upstream patch. If a user knows that the patch has substantial differences, then the user may choose to forgo the patch comparison process.

Figure 5:
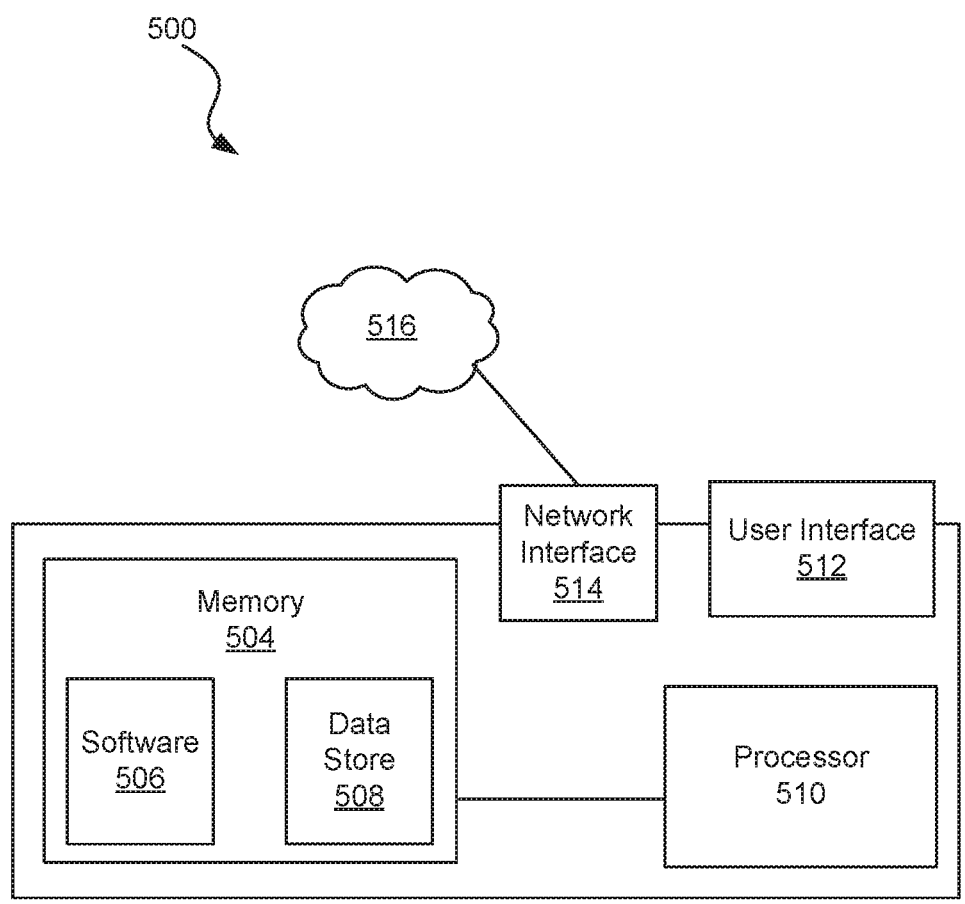
FIG. 5 is a diagram showing an illustrative computing system that may perform patch comparison as described herein, according to one example of principles described herein.

The method 400 further includes a process 406 for, in response to the determining, performing a compare operation that compares the software patch for the proprietary version of the application with a corresponding software patch for an upstream version of the application, the compare operation being configured to account for differences between the proprietary version of the application and the upstream version of the application. In some examples, if the distribution patch matches the upstream patch (except for the known differences such as line numbers and index numbers), then the distribution patch may be tagged as such. Tagging a distribution patch as a match with the corresponding upstream patch allows a patch reviewer to devote fewer resources to reviewing the patch. Thus, the patch reviewer may be able to devote more resources to patches that are not tagged as having a match. As mentioned above, in one example, patches that are tagged as a match may be placed in one queue for review while patches that are not tagged may be placed in a separate queue for review FIG. 5 is a diagram showing an illustrative computing system that may perform patch comparison as described herein. For example, the computing system 500 may be used to perform the functions performed in methods 300 and 400. Other functions described herein may also be performed by computing systems such as computing system 500. According to certain illustrative examples, the computing system 500 includes a memory 504 which may include software 506 and a data store 508. The processing system 500 also includes a processor 510, a network interface 514, and a user interface 512.

The memory 504 may be one of several different types of memory. Some types of memory, such as solid-state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software 506 and data in the data store 508.

The computing system 500 also includes a processor 510 for executing the software 506 and using or updating the data 508 stored in memory 504. The software 506 may include an operating system and any other software applications a user may wish to install. In some examples, the computing system 500 may be associated with a user. The software 506 may include machine readable instructions of a computer program product that when executed, perform the functions described above. For example, the software 506 may include the logic to provide the patch comparison module (e.g., 112).

The user interface 512 may include a number of input devices such as a mouse, touchpad, or touchscreen that allow the user to interact with the computing system 500. The user interface 512 may also include a number of different types of output devices such as a monitor or a touchscreen. The user interface allows the user to interact with the processing system 500 in a manner as described above.

The network interface 514 may include hardware and software that allows the processing system 500 to communicate with other processing systems over a network 516. The network interface 514 may be designed to communicate with the network 516 through hardwire media such as Ethernet, coaxial, fiber-optic, etc. The network interface 514 may also be designed to communicate with the network 516 using wireless technologies.

Some examples of processing systems described herein may include non-transitory, tangible, machine readable media that include executable code that when run by one or more processors may cause the one or more processors to perform the processes of methods as described above. Some common forms of machine-readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
   receiving a first version of a software patch for an application;
   receiving a second version of the software patch, the second version being associated with an upstream version of the application;
   comparing the first version of the software patch with the second version of the software patch, the comparing accounting for differences between the first version of the software patch and the second version of the software patch that result from differences between the application and the upstream version of the application;
   in response to comparing, tagging the first version of the software patch as a match when the only differences between the first version of the software patch and the second version of the software patch are those that result from differences between the application and the upstream version of the application.

2. The method of claim 1, wherein the differences between the first version of the software patch and the second version of the software patch that result from differences between the application and the upstream version of the application include differences in line numbers.

3. The method of claim 1, wherein the differences between the first version of the software patch and the second version of the software patch that result from differences between the application and the upstream version of the application include differences in index numbers.

4. The method of claim 1, further comprising, in response to determining that there are differences other than the differences between the first version of the software patch and the second version of the software patch that result from differences between the application and the upstream version of the application, flagging the first version of the software patch for review.

5. The method of claim 1, wherein the application is a distribution version of the application.

6. The method of claim 1, wherein the application is an operating system kernel.

7. The method of claim 1, further comprising, performing the comparing on a plurality of additional patches.

8. The method of claim 7, further comprising, placing tagged patches that represent a match to upstream versions in a first queue and placing patches that do not represent a match to upstream versions in a second queue.

9. The method of claim 1, wherein the comparing is triggered by a keyword associated with a posting process to provide the first version of the software patch.

10. The method of claim 1, wherein the upstream version of the application is an open-source application.

11. A method comprising:
    receiving a posting of a software patch for a distribution version of an application;
    determining that the software patch has been tagged for comparison with a version of the software patch for an upstream version of the application;
    in response to the determining, performing a compare operation that compares the software patch for the distribution version of the application with a corresponding software patch for an upstream version of the application, the compare operation being configured to account for differences between the distribution version of the application and the upstream version of the application; and
    based on the compare operation, tagging the distribution version of the software patch as a match when the only differences between the software patch for the distribution version of the application and the software patch for the upstream version of the application are those that result from differences between the application and the upstream version of the application.

12. The method of claim 11, further comprising, tagging the software patch for further review in response to the determining that there are differences between the software patch for the distribution version of the application and the software patch for the upstream version of the application.

13. The method of claim 1, wherein to account for the differences between the distribution version of the application and the upstream version of the application, the compare operation accounts for line number differences.

14. The method of claim 1, wherein to account for the differences between the distribution version of the application and the upstream version of the application, the compare operation accounts for index number differences.

15. The method of claim 1, wherein receiving the post is through an e-mail.

16. The method of claim 1, wherein the compare operation is triggered based on a keyword associated with the posting.

17. The method of claim 1, wherein the application is an operating system kernel.

18. A system comprising:
   a processor; and
   a memory comprising machine readable instructions that when executed by the processor, cause the system to:
      receive a first version of a software patch for an application;
      receive a second version of the software patch, the second version being associated with an upstream version of the application;
      compare the first version of the software patch with the second version of the software patch, the comparing accounting for differences between the first version of the software patch and the second version of the software patch that result from differences between the application and the upstream version of the application;
      in response to the comparing, tag the first version of the software patch as a match when the only differences between the first version of the software patch and the second version of the software patch are those that result from differences between the application and the upstream version of the application.

19. The system of claim 18, wherein the differences between the first version of the software patch and the second version of the software patch that result from differences between the application and the upstream version of the application include differences in line numbers.

20. The system of claim 18, wherein the differences between the first version of the software patch and the second version of the software patch that result from differences between the application and the upstream version of the application include differences in index numbers.

* * * * *